(12) United States Patent
Tsuji

(10) Patent No.: US 6,567,756 B1
(45) Date of Patent: May 20, 2003

(54) PORTABLE PRESSURE MEASURING APPARATUS

(75) Inventor: Tomoharu Tsuji, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/595,157

(22) Filed: Jun. 15, 2000

(30) Foreign Application Priority Data

Jun. 18, 1999 (JP) .......................... 11-173226
May 26, 2000 (JP) .......................... 2000-156494

(51) Int. Cl.⁷ .................. G08B 23/00; G04B 47/06
(52) U.S. Cl. .................. 702/50; 368/11; 340/970; 701/4
(58) Field of Search .............. 702/50, 189; 368/11, 368/69.223, 187, 295; 73/37, 754; 701/4.5; 340/970, 977, 963, 945

(56) References Cited

U.S. PATENT DOCUMENTS 5,295,085 A    3/1994  Hoffacker ............ 701/8
5,583,830 A  * 12/1996  Okuyama ............ 368/11
6,452,510 B1 *  9/2002  Zysko ............ 340/970

* cited by examiner

Primary Examiner—Kamini Shah
(74) Attorney, Agent, or Firm—Adams & Wilks

(57) ABSTRACT

A portable pressure measuring apparatus detects a designated altitude by sensing an outside atmospheric pressure. An A/D converter generates pressure data corresponding to the outside pressure. Pressure data corresponding to a designated altitude is stored in a memory, and the pressure data generated by the A/D converter is compared with the stored pressure data. The designated altitude may be set to any value through a manually-operated input switch and converted into pressure data. Alternatively, the designated altitude may be set as the altitude at which the apparatus is positioned by converting pressure data generated by the A/D converter at that altitude into a corresponding altitude.

19 Claims, 8 Drawing Sheets

PORTABLE PRESSURE MEASURING APPARATUS

BACKGROUND OF THE INVENTION

1. Field of the Invention

The present invention relates to a portable pressure measuring apparatus for detecting a designated altitude by sensing an outside pressure, and more particularly to a portable pressure measuring apparatus for detecting a designated altitude by using pressure data so that a high time resolution is obtained.

2. Description of the Prior Art

As a conventional portable pressure measuring apparatus, there is known a wristwatch with an altitude measurement function. FIG. 5 is a block diagram showing a schematic structure of a conventional wristwatch with an altitude measurement function. The conventional wristwatch with the altitude measurement function includes a pressure sensor 501 for sensing an outside pressure, that is, an atmospheric pressure, an A/D conversion portion 502 for generating digital pressure data by performing A/D (analog/digital) conversion of sensor output (sensing result) of the pressure sensor 501, a calculation portion 503 for calculating altitude data corresponding to the pressure data generated in the A/D conversion portion 502, a measurement control portion 504 for controlling the pressure sensor 501 and the A/D conversion portion 502, a control portion 505 for controlling the whole of the wristwatch with the altitude measurement function, a switch input portion 506 by which a user makes input, a display portion 507 for making display, and a storage portion 508 for storing data.

The storage portion 508 stores altitude data of a designated altitude as a threshold, and the control portion 505 compares the altitude data calculated by the calculation portion 503 with the altitude data stored in the storage portion 508 to detect the designated altitude. In the case where the designated altitude is detected, the control portion 505 gives an alarm.

In the above structure, the operation of the conventional wristwatch with the altitude measurement function will be described with reference to FIGS. 6, 7 and 8. FIG. 6 is a flowchart showing the flow of normal altitude measurement processing in the conventional wristwatch with the altitude measurement function. In the normal altitude measurement processing of the conventional wristwatch with the altitude measurement function, first, the control portion 505 drives the pressure sensor 501 through the measurement control portion 504 to sense the outside pressure (step S601). Subsequently, the A/D conversion portion 502 makes A/D conversion of sensor output of the pressure sensor 501 to generate pressure data (step S602). Next, the calculation portion 503 inputs the pressure data from the A/D conversion portion 502 and calculates altitude data corresponding to the input pressure data (step S603). The control portion 505 inputs the altitude data from the calculation portion 503 and causes the display portion 507 to display the altitude (step S604). Here, a pressure value may be displayed, or the pressure data or the altitude data calculated in the calculation portion 503 may be stored in the storage portion 508.

Next, the process for setting of a threshold altitude will be described. In the case where there occurs an input for setting a measurement value of an altitude as a threshold, or there occurs an input for setting a threshold by a user's direct designation of an altitude, the setting processing of the threshold is started. FIG. 7 is a flowchart showing the flow of the process for setting of a threshold altitude in the conventional wristwatch with the altitude measurement function. In the setting processing of the threshold in the conventional wristwatch with the altitude measurement function, first, the control portion 505 judges whether there occurred an input for setting a measurement value of an altitude as a threshold through the switch input portion 506 (step S701).

In the case where the input for setting the measurement value of the altitude as the threshold was made, the control portion 505 drives the pressure sensor 501 to sense an outside pressure (step S702), the A/D conversion portion 502 makes A/D conversion of sensor output of the pressure sensor 501 to generate pressure data (step S703), and the calculation portion 503 calculates altitude data from the pressure data generated in the A/D conversion portion 502 (step S704). On the other hand, in the case where it is judged, at step S701, that the input for setting the measurement value of the altitude as the threshold was not made, altitude data is input through the switch input portion 506 (step S706). The control portion 505 causes the storage portion 508 to store the altitude data calculated in the calculation portion 503 or the altitude data input through the switch input portion 506 as the threshold (step S705).

Next, detection processing of an altitude will be described. In the case where there occurs an input of instructions to start detection processing through the switch input portion 506, the detection processing of the altitude is started. FIG. 8 is a flowchart showing the flow of the detection processing of the altitude in the conventional wristwatch with the altitude measurement function. In the detection processing of the altitude in the conventional wristwatch with the altitude measurement function, first, the control portion 505 drives the pressure sensor 501 to sense the outside pressure (step S801), the A/D conversion portion 502 makes A/D conversion of sensor output of the pressure sensor 501 to generate pressure data (step S802), and the calculation portion 503 calculates altitude data from the pressure data generated in the A/D conversion portion 502 (step S803). The control portion 505 inputs the altitude data calculated in the calculation means 503, and displays the altitude through the display portion 507 (step S804).

Next, the control portion 505 compares the altitude data calculated in the calculation portion 503 with the altitude data stored in the storage portion 508, and judges whether the calculated altitude data exceeds the stored altitude data, that is, whether the difference between the calculated altitude data and the stored altitude data is changed from a positive to a negative or from a negative to a positive (S805). In the case where the altitude data calculated in the calculation portion 503 does not exceed the altitude data stored in the storage portion 508, the processing returns to step S801. In the case where the altitude data calculated in the calculation portion 503 exceeds the altitude data stored in the storage portion 508, it is judged that the designated altitude is detected and the processing is ended.

Here, in a time required for the detection processing of the altitude, the ratio of a calculation time for calculating the altitude data at step S803 is large, and a time resolution of the altitude detection, that is, a measurement period in which the steps from step S801 to step S805 are repeated mainly depends on the calculation time of step S803. Thus, calculation processing capacity to a certain extent is required. If a clock frequency of the conventional wristwatch with the altitude measurement function is a clock frequency (several tens of kHz to several MHz) of a general portable apparatus, the time resolution of the altitude detection become s about several hundred ms.

As described above, according to the conventional portable pressure measuring apparatus, the designated altitude is detected by comparing the previously stored altitude data of the designated altitude with the altitude data calculated from the pressure data corresponding to the outside pressure.

However, according to the foregoing conventional technique, since the calculation time for determining altitude is long and the time resolution of the altitude detection is coarse, in the case where it is used in an application in which the altitude changes at a high speed, for example, gliding on skis, skydiving, or the like, which requires a time resolution of about 100 ms to 10 ms, a time delay in the altitude detection can not be neglected, and there has been a problem in that suitable altitude detection can not be achieved.

The present invention has been made in view of the above, and an object thereof is to lessen a time delay in altitude detection and to enable suitable altitude detection.

SUMMARY OF THE INVENTION

In order to achieve the above object, according to a portable pressure measuring apparatus of the invention, in the portable pressure measuring apparatus for detecting a designated altitude by sensing an outside pressure, in order to enable the operation of altitude data calculation to be omitted in altitude detection processing (detection processing of an altitude), there are provided generation means for generating pressure data corresponding to the outside pressure, storage means for storing pressure data corresponding to the designated altitude, and detection means for detecting the designated altitude by comparing the pressure data generated in the generation means with the pressure data stored in the storage means. Here, if display of the pressure and altitude is omitted, a time of display processing can be further saved.

Besides, it is also permissible to provide input means for inputting the designated altitude, and pressure data calculation means for calculating pressure data corresponding to the designated altitude inputted through the input means and for storing it in the storage means, so that the designated altitude can be directly set. Besides, it is also permissible to provide input means for inputting instructions to set an altitude where the apparatus itself is positioned as the designated altitude, and pressure data setting means for storing pressure data generated in the generation means as the pressure data corresponding to the designated altitude into the storage means in the case where input is made through the input means, so that the altitude where the apparatus itself is positioned can be set as the designated altitude.

Moreover, it is also permissible to provide generated pressure data, storage means for storing the pressure data generated in the generation means, and altitude data calculation means for calculating altitude data on the basis of the pressure data stored in the generated pressure data storage means, so that a change in altitude during altitude detection processing can be confirmed after the altitude detection processing is ended. Besides, in addition to the altitude, the depth of water may be detected.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
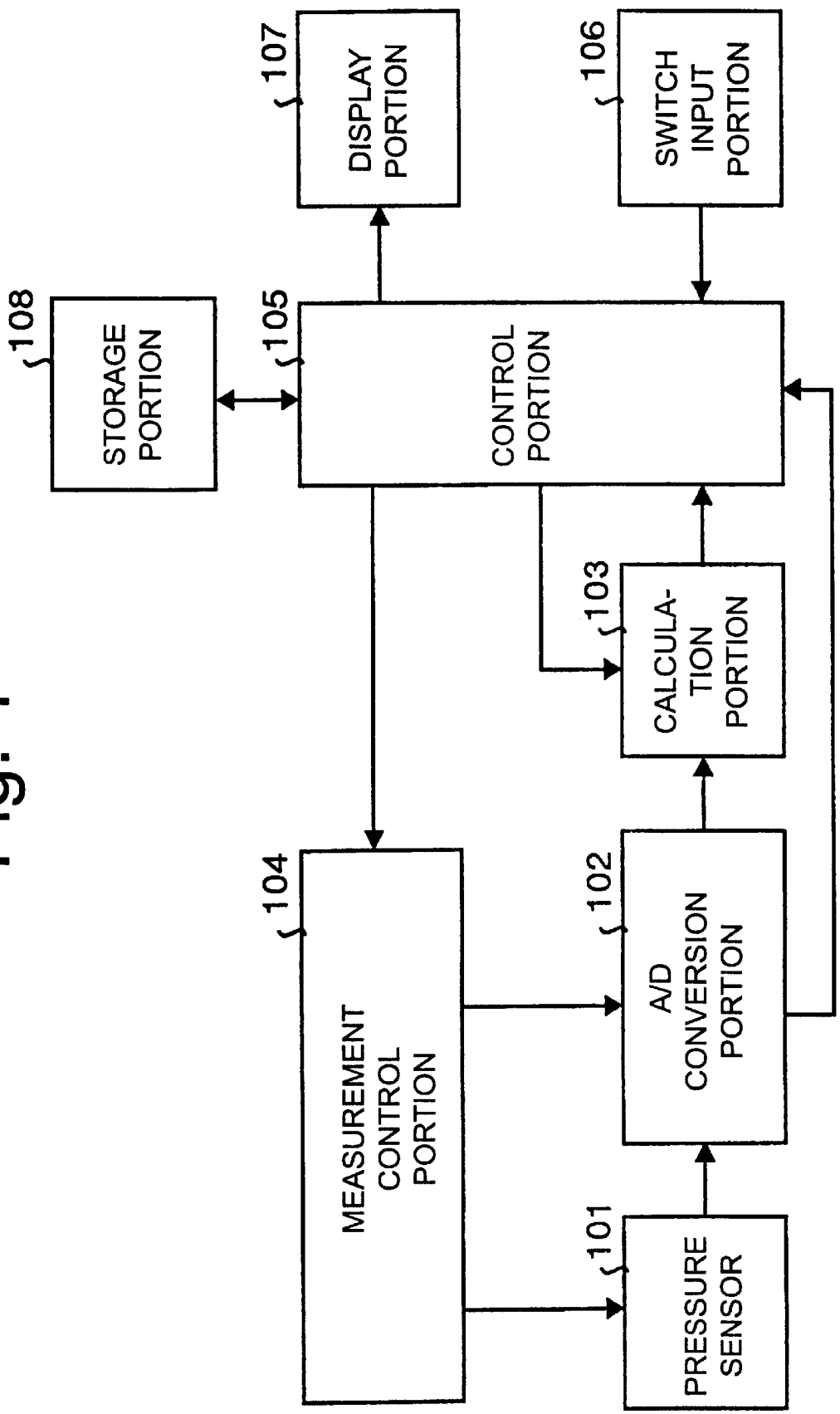
FIG. 1 is a block diagram showing a schematic structure of a wristwatch with an altitude measurement function according to an embodiment of the invention.

Hereinafter, embodiments of the present invention will be described in detail with reference to accompanying drawings. Here, as a portable pressure measuring apparatus of an embodiment of the invention, a wristwatch with an altitude measurement function will be exemplified. FIG. 1 is a block diagram showing a schematic structure of a wristwatch with an altitude measurement function according to an embodiment of the invention.

The wristwatch with the altitude measurement function of the embodiment includes a pressure sensor 101 for sensing an outside pressure, that is, an atmospheric pressure, an A/D conversion portion 102 for generating digital pressure data by carrying out A/D (analog/digital) conversion of sensor output (sensing result) of the pressure sensor 101, a calculation portion 103 for calculating altitude data corresponding to pressure data and for calculating pressure data corresponding to altitude data, a measurement control portion 104 for controlling the pressure sensor 101 and the A/D conversion portion 102, a control portion 105 for controlling the whole of the wristwatch with the altitude measurement function, a switch input portion 106 by which a user makes input, a display portion 107 for making display, and a storage portion 108 for storing data.

The storage portion 108 stores pressure data corresponding to a designated altitude as a threshold, and the control portion 105 compares the pressure data generated in the A/D conversion portion 102 with the pressure data stored in the storage portion 108 to detect the designated altitude. In the case where the designated altitude is detected, the control portion 105 gives an alarm.

Incidentally, the pressure sensor 101 and the A/D conversion portion 102 correspond to generation means of the invention, the storage portion 108 corresponds to storage means and generated pressure data storage means of the invention, the control portion 105 corresponds to detection means and pressure data setting means of the invention, the switch input portion 106 corresponds to input means of the invention, the calculation means 103 corresponds to altitude data calculation means, and the control portion 105 and the calculation portion 103 correspond to pressure data calculation means of the invention.

Figure 2:
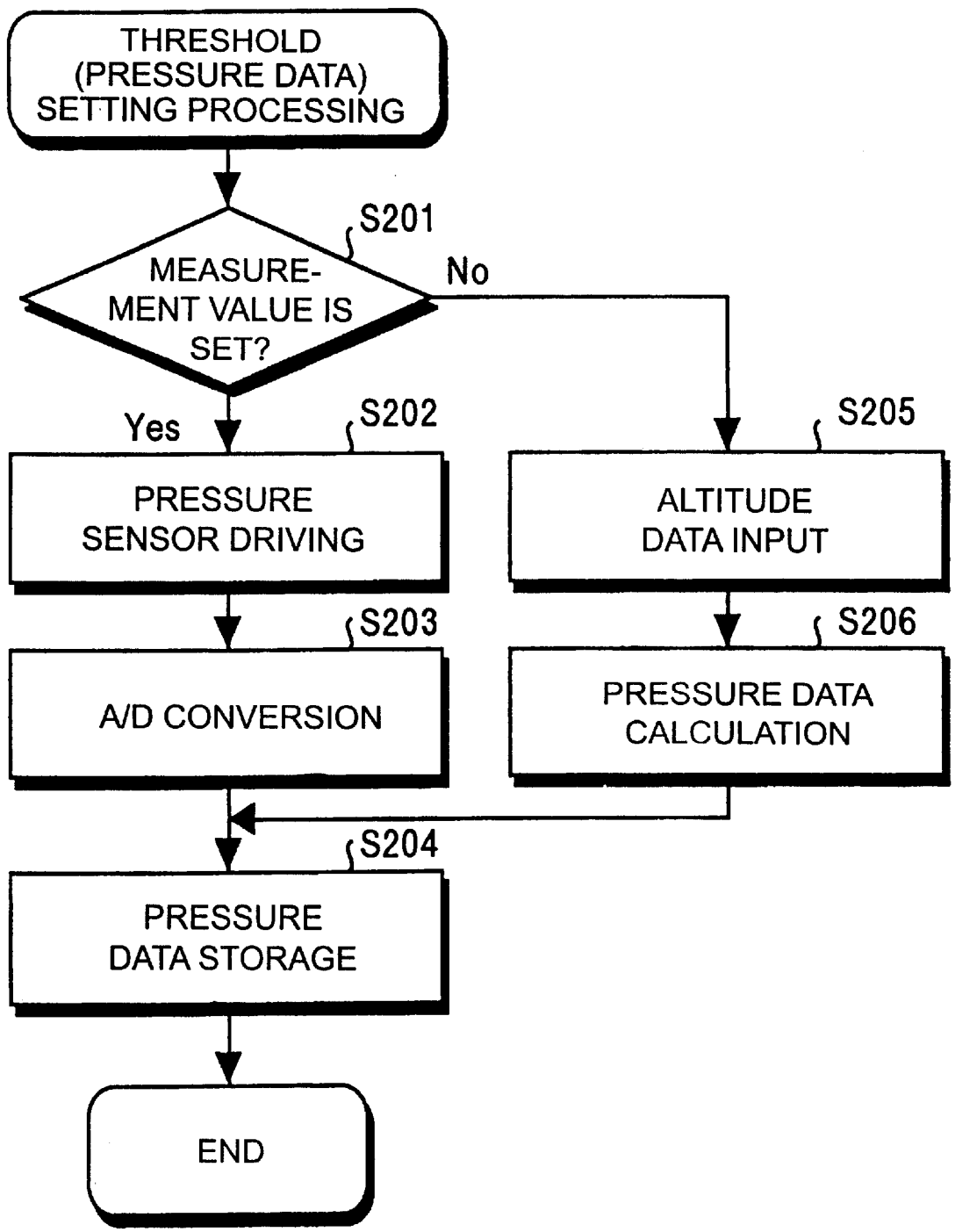
FIG. 2 is a flowchart showing the flow of threshold setting processing in the wristwatch with the altitude measurement function of the embodiment.
Figure 3:
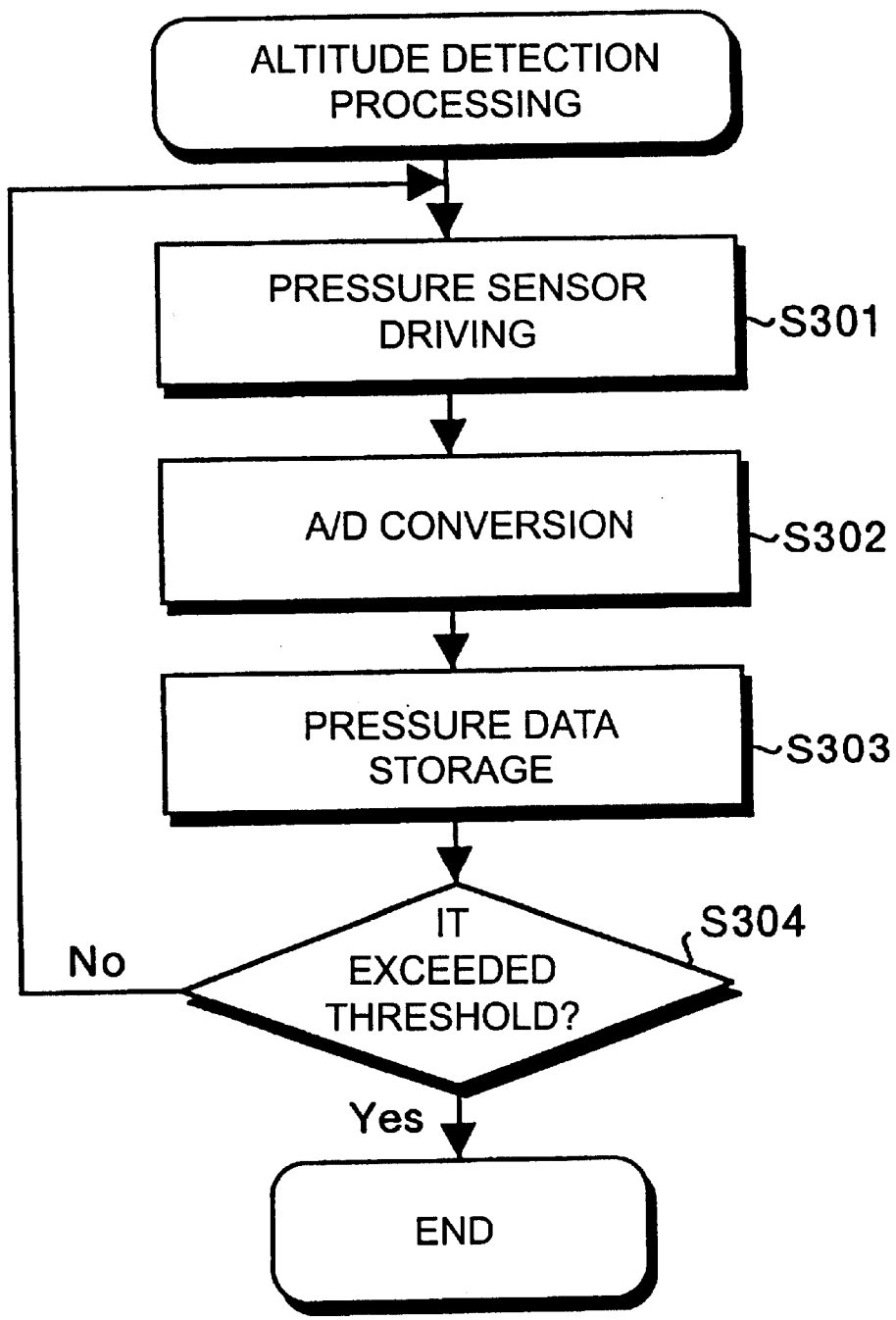
FIG. 3 is a flowchart showing altitude detection processing in the wristwatch with the altitude measurement function of the embodiment.
Figure 4:
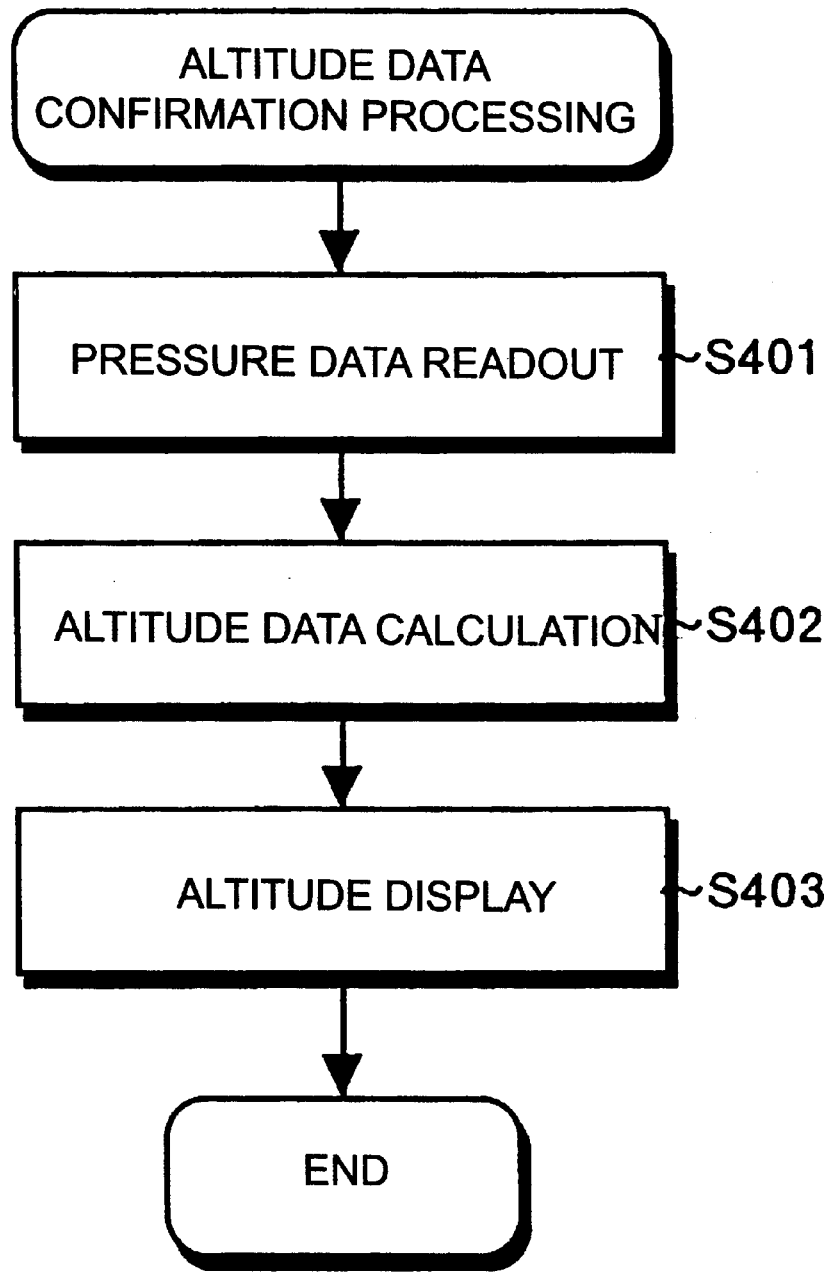
FIG. 4 is a flowchart showing the flow of altitude data confirmation processing of the embodiment.
Figure 5:
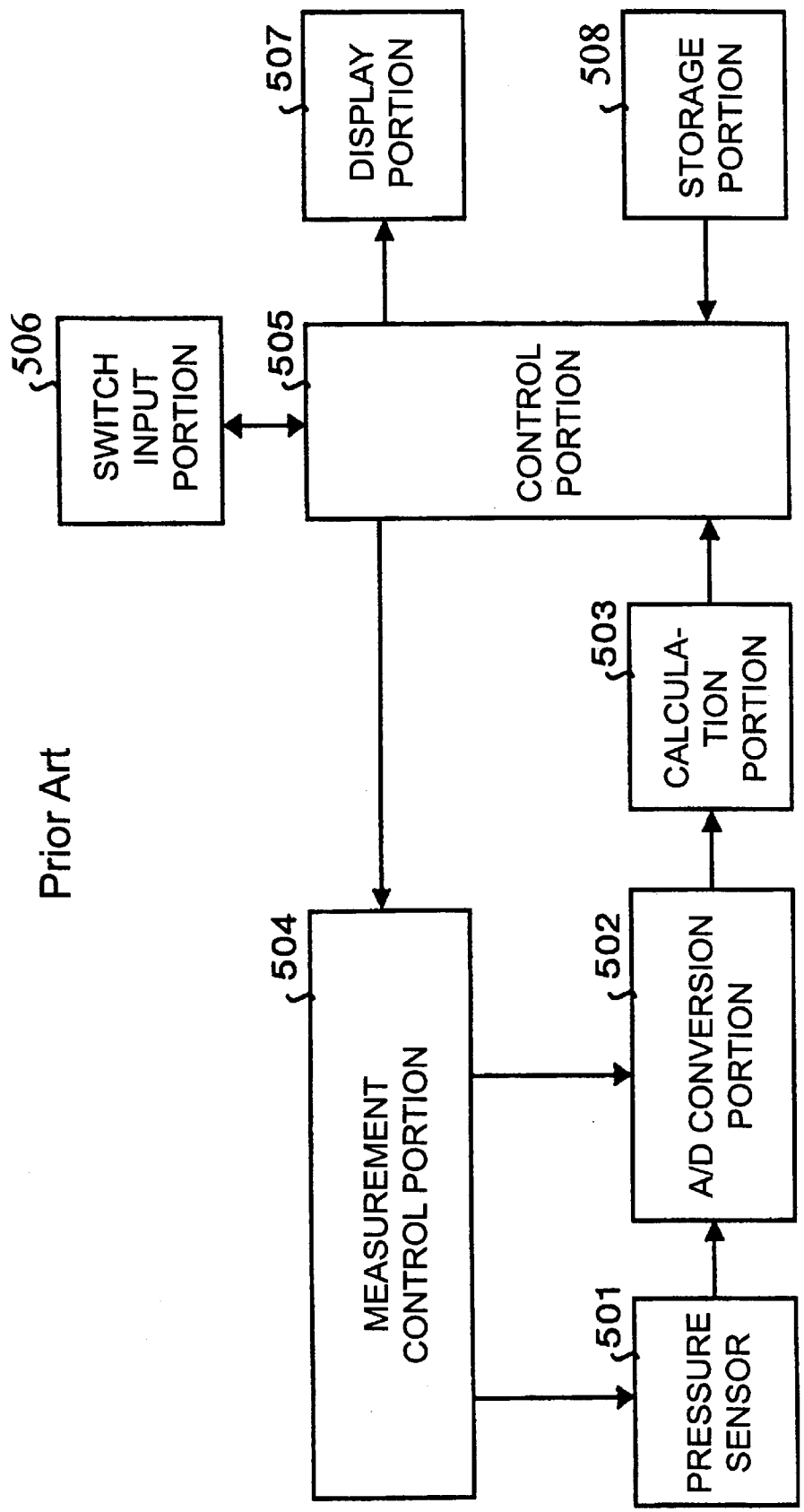
FIG. 5 is a block diagram showing a schematic structure of a conventional wristwatch with an altitude measurement function.
Figure 6:
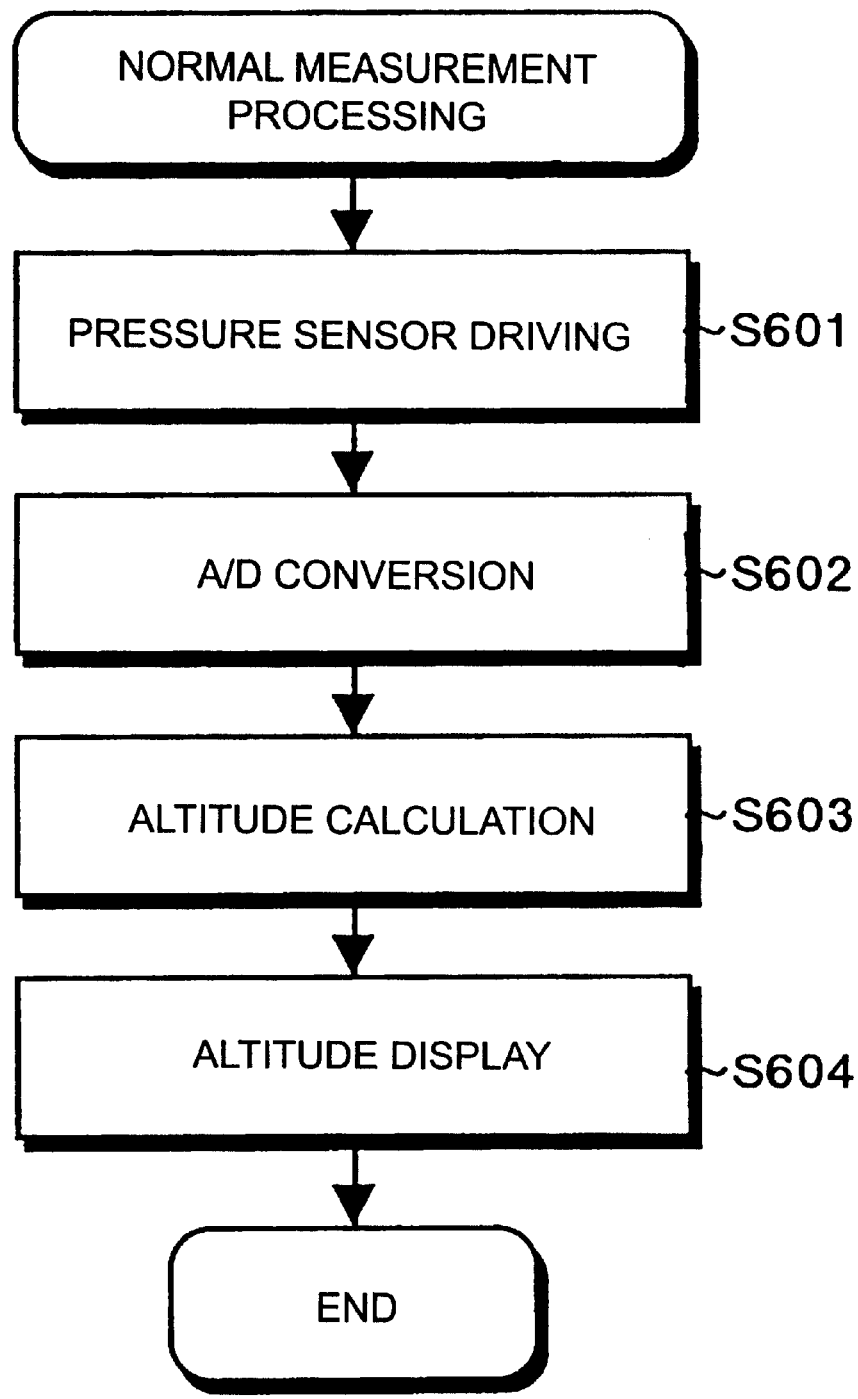
FIG. 6 is a flowchart showing the flow of normal altitude measurement processing in the conventional wristwatch with the altitude measurement function.
Figure 7:
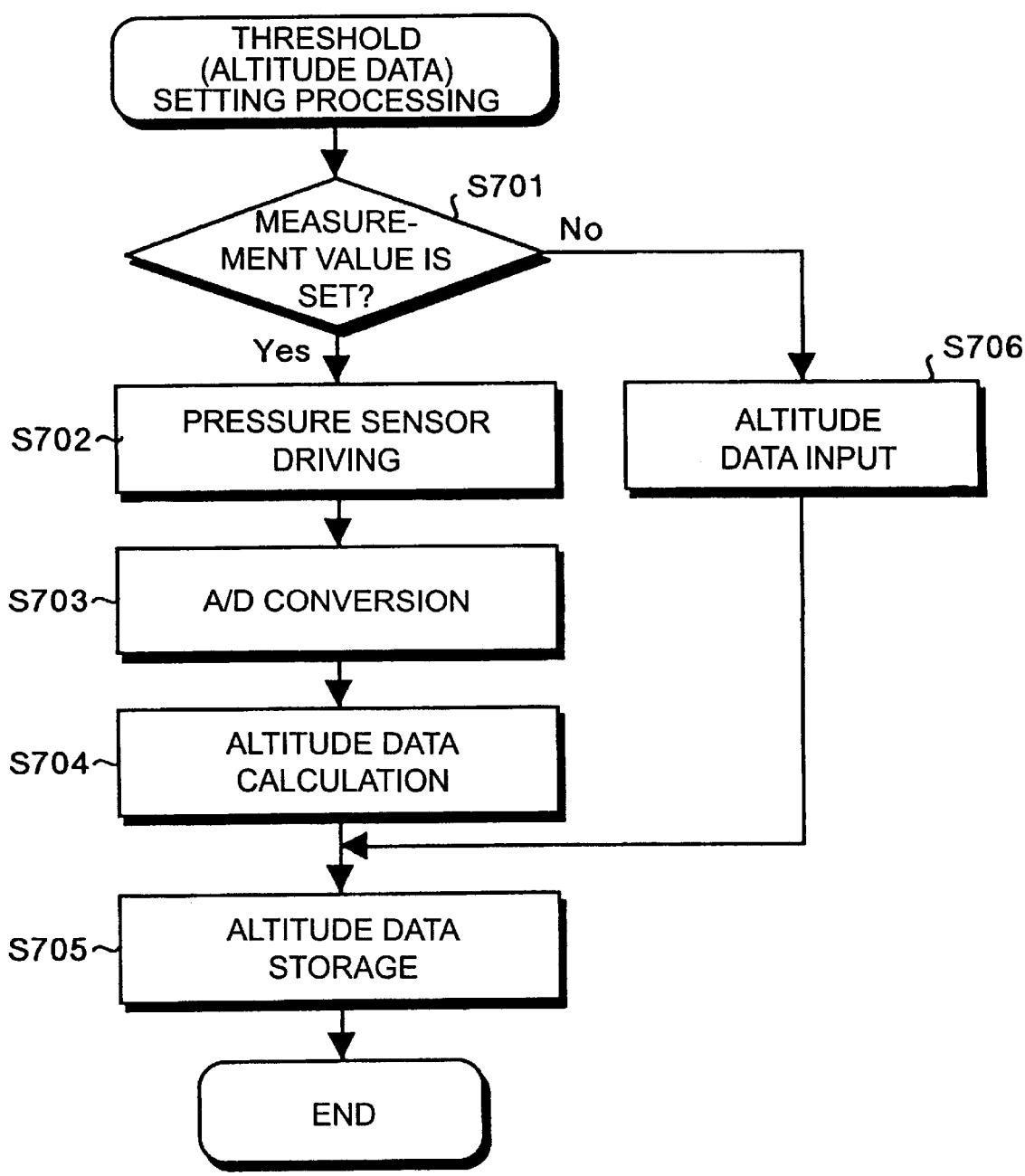
FIG. 7 is a flowchart showing the flow of threshold setting processing in the conventional wristwatch with the altitude measurement function.
Figure 8:
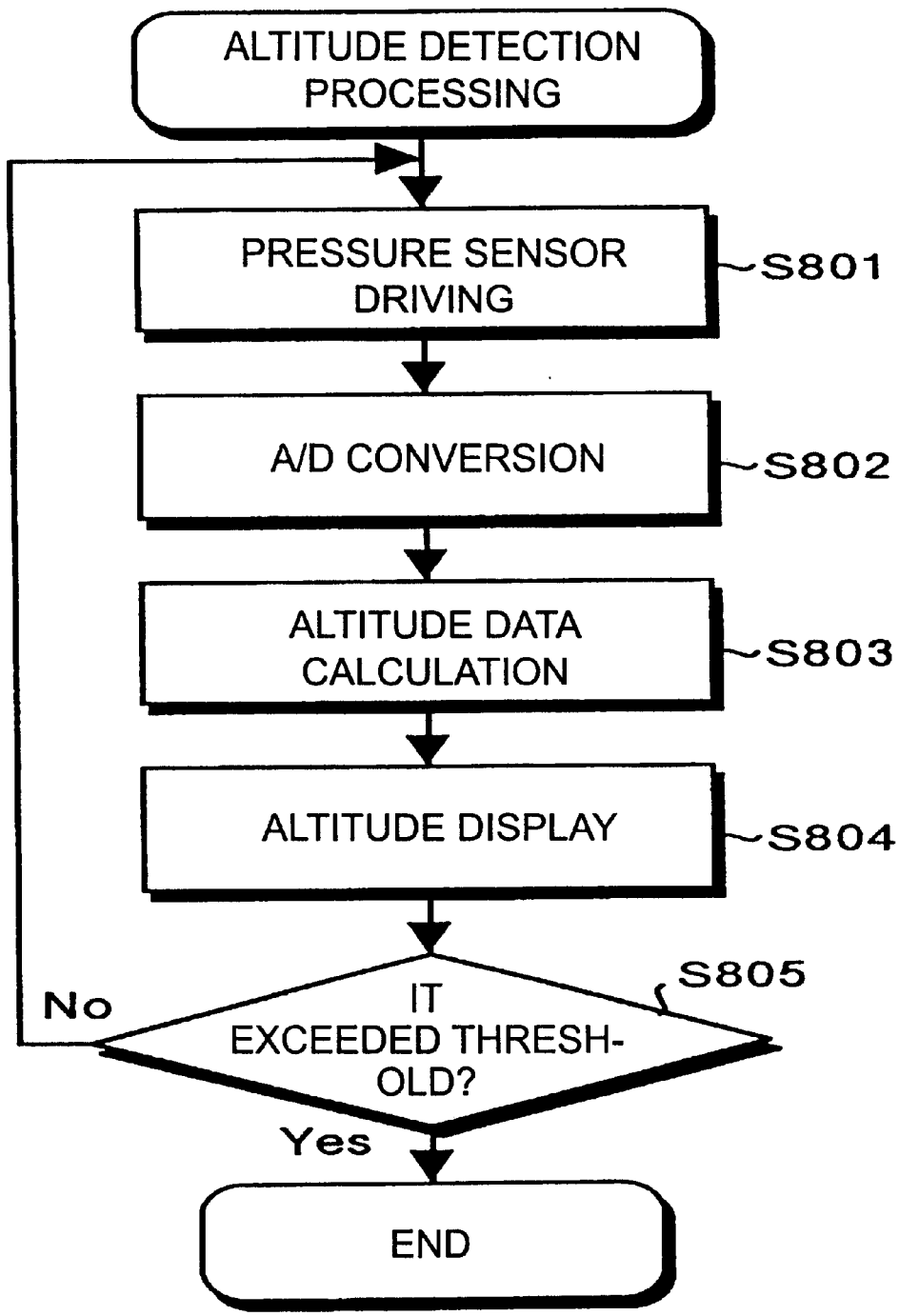
FIG. 8 is a flowchart showing the flow of altitude detection processing in the conventional wristwatch with the altitude measurement function.

In the foregoing structure, the operation of this embodiment will be described with reference to FIGS. 2, 3 and 4. Incidentally, although the wristwatch with the altitude measurement function of this embodiment performs normal altitude measurement processing to measure and display the altitude where the apparatus itself is positioned, since this normal altitude measurement processing is the same as the foregoing conventional normal altitude measurement processing, the description is omitted.

First, threshold setting processing for setting pressure data corresponding to a designated altitude as a threshold will be described. In the case where there occurs an input of instructions to set a self-positioned altitude as a threshold, or an input for setting a threshold by a user's direct designation of an altitude, the threshold setting processing is started. FIG. 2 is a flowchart showing the flow of the threshold setting processing in the wristwatch with the altitude measurement function of the embodiment. In the threshold setting processing in the wristwatch with the altitude measurement function of the embodiment, first, the control portion 105 judges whether there occurred an input of instructions to set the self-positioned altitude as the threshold through the switch input portion 106 (step S201).

In the case where there occurred the input of instructions to set the self-positioned altitude as the threshold, the control portion 105 drives the pressure sensor 101 through the measurement control portion 104 to sense an outside pressure (step S202), and the A/D conversion portion 102 generates pressure data through A/D conversion of sensor output of the pressure sensor 101 (step S203). On the other hand, in the case where it is judged, at step S201, that there did not occur the input of instructions to set the self-positioned altitude as the threshold, altitude data from the user is inputted through the switch input portion 106 (step S205). The control portion 105 causes the calculation portion 103 to calculate pressure data corresponding to the altitude data desired by the user and inputted through the switch input portion 106, that is, causes reverse operation for the pressure data (step S206). The control portion 105 stores the pressure data generated in the A/D conversion portion 102 or the pressure data calculated in the calculation portion 103 as the threshold in the storage portion 108 (step S204).

Next, altitude detection processing for detecting the designated altitude will be described. In the case where there occurs an input of instructions to start the altitude detection processing through the switch input portion 106, the altitude detection processing is started. FIG. 3 is a flowchart showing the flow of the altitude detection processing in the wristwatch with the altitude measurement function of this embodiment. In the altitude detection processing of this embodiment, first, the control portion 105 drives the pressure sensor 101 to sense an outside pressure (step S301), and the A/D conversion portion 102 makes A/D conversion of sensor output of the pressure sensor 101 to generate pressure data (step S302). The control portion 105 inputs the pressure data generated in the A/D conversion portion 102 and causes the storage portion 108 to store it (step S303). Here, calculation of altitude data taking a long time and display of a pressure and altitude are omitted.

Next, the control portion 105 compares the pressure data generated in the A/D conversion portion 102 with the pressure data stored in the storage portion 108 as the threshold, and judges whether the pressure data generated in the A/D conversion portion 102 exceeds the pressure data stored in the storage portion 108 as the threshold, that is, the difference between the pressure data generated in the A/D conversion portion 102 and the pressure data stored in the storage portion 108 as the threshold is changed from a positive to a negative or from a negative to a positive (S304). In the case where the pressure data generated in the A/D conversion portion 102 does not exceed the pressure data stored in the storage portion 108 as the threshold, the processing returns to step S301, and in the case where the pressure data generated in the A/D conversion portion 102 exceeds the pressure data stored in the storage portion 108 as the threshold, it is judged that the designated altitude is detected and the processing is ended.

Here, in order to indicate the speed of change in the altitude, in addition to the designated altitude, the change of a constant interval in the altitude may detected, and every time of detection of the change of the constant interval in the altitude, an alarm may be given.

Next, altitude data confirmation processing for confirming altitude data during the altitude detection processing after the altitude detection processing will be described. FIG. 4 is a flowchart showing the flow of the altitude data confirmation processing of this embodiment. In the altitude data confirmation processing, the control portion 105 reads out the pressure data stored at the altitude detection processing in the storage portion 108 (step S401), causes the calculation portion 103 to calculate altitude data corresponding to the read out pressure data (step S402), and inputs the altitude data calculated in the calculation portion 103 to display the altitude through the display portion 107 (step S403).

As described above, according to the portable pressure measuring apparatus of this embodiment, the pressure data corresponding to the designated altitude is stored, the stored pressure data is compared with the pressure data corresponding to the outside pressure, and the designated altitude is detected. That is, in the altitude detection processing, since calculation of altitude data which occupies a large part of a time taken in the conventional detection processing of the altitude is omitted, a time resolution of altitude detection, that is, a time interval (measurement frequency) in which the steps from step S301 to step S304 are repeated is shortened, and suitable altitude detection can be made even in the case where it is used for a use in which the altitude changes at a high speed, for example, gliding on skis skydiving, or the like, which requires a time resolution of about 100 ms to 10 ms.

Besides, also in the case where normal altitude detection is performed, by using this apparatus, even if operation processing capacity is small, altitude detection can be made. Further, the pressure data generated in the altitude detection processing is stored, and the altitude data is calculated from the stored pressure data after the end of the altitude detection processing, so that the altitude data during the altitude detection processing can be confirmed. Incidentally, instead of the altitude detection, application can also be made to the case where the depth of water is detected.

As described above, the portable pressure measuring apparatus of the invention stores pressure data corresponding to a designated altitude, generates pressure data corresponding to an outside pressure, and compares the generated pressure data with the stored pressure data to detect the designated altitude, so that calculation of altitude data can be omitted in the processing of detecting the designated altitude, a time delay in altitude detection can be made small, and suitable altitude detection can be made.

Besides, the portable pressure measuring apparatus of the invention calculates and stores pressure data corresponding to an inputted designated altitude, generates pressure data corresponding to an outside pressure, and compares the generated pressure data with the stored pressure data to detect the designated altitude, so that the designated altitude to be detected can be inputted as it is without the pressure data corresponding to the designated altitude calculated by the user, and a load for the user can be reduced, and further, calculation of altitude data in the processing of detecting the designated altitude can be omitted, a time delay in the altitude detection can be made small, and suitable altitude detection can be made.

Besides, the portable pressure measuring apparatus of the invention inputs an instruction to set an altitude where the apparatus itself is positioned as a designated altitude, and stores generated pressure data as pressure data corresponding to the designated altitude, so that the user can set an altitude at a desired position as the designated altitude.

Besides, the portable pressure measuring apparatus of the invention stores generated pressure data, and calculates altitude data on the basis of the stored pressure data, so that altitude data during altitude detection processing can be confirmed after the altitude detection processing.

What is claimed is:

1. A portable pressure measuring apparatus for detecting when a designated altitude has been reached by sensing an atmospheric pressure, the portable pressure measuring apparatus comprising:

pressure data generating means for generating pressure data corresponding to a detected atmospheric pressure outside of the apparatus;

storage means for storing a pressure data value corresponding to the designated altitude; and detection means for detecting when the designated altitude has been reached by comparing the pressure data generated by the pressure data generating means with the pressure data value stored in the storage means, without converting the pressure data into a corresponding altitude value during measurement.

2. A portable pressure measuring apparatus according to claim 1; further comprising input means for inputting the designated altitude; and pressure data calculation means for calculating pressure data corresponding to the designated altitude input by the input means and for storing the calculated pressure data in the storage means.

3. A portable pressure measuring apparatus according to claim 1; further comprising input means for setting a current altitude at which the apparatus is positioned as the designated altitude; and pressure data setting means for storing the pressure data generated by the pressure data generating means at the current altitude as the pressure data value corresponding to the designated altitude when the input means sets the current altitude as the designated altitude.

4. A portable pressure measuring apparatus according to claim 1; further comprising generated pressure data storage means for storing the pressure data generated by the pressure data generating means; and altitude calculation means for calculating an altitude on the basis of the pressure data stored in the generated pressure data storage means.

5. A portable pressure measuring apparatus according to claim 2; further comprising generated pressure data storage means for storing the pressure data generated by the pressure data generating means; and altitude calculation means for calculating an altitude on the basis of the pressure data stored in the generated pressure data storage means.

6. A portable pressure measuring apparatus according to claim 3; further comprising generated pressure data storage means for storing the pressure data generated by the pressure data generating means; and altitude calculation means for calculating an altitude on the basis of the pressure data stored in the generated pressure data storage means.

7. A portable pressure measuring apparatus according to claim 1; further comprising a main body for housing the pressure data generating means, the storage means and the detection means; and a strap for mounting the main body to a user's arm.

8. A portable pressure measuring apparatus according to claim 1; wherein the pressure data generating means comprises a pressure sensor for sensing atmospheric pressure and producing a corresponding output signal, and an A/D converter for converting the output signal of the pressure sensor into a digital value.

9. A portable pressure measuring apparatus according to claim 1; further comprising calculating means for calculating the pressure data value corresponding to the designated altitude.

10. A portable pressure measuring apparatus according to claim 1; further comprising input means for inputting the designated altitude; and calculating means for calculating the pressure data value to be stored in the storage means based on the input designated altitude; wherein the pressure data generating means comprises a pressure sensor for sensing atmospheric pressure and producing a corresponding output signal, and an A/D converter for converting the output signal of the pressure sensor into a digital value; and the calculating means and detection means comprise a processing circuit.

11. A portable pressure measuring apparatus according to claim 10; further comprising altitude calculation means for calculating an altitude of the apparatus on the basis of an output of the pressure data generating means.

12. A portable pressure measuring apparatus according to claim 10; wherein the input means sets a current altitude at which the apparatus is positioned as the designated altitude; and further comprising means for storing in the storage means the pressure detected by the pressure sensor at the current altitude when the input means sets the current altitude as the designated altitude.

13. A portable pressure measuring apparatus according to claim 10; wherein the input means comprises a switch mounted to a housing of the apparatus for inputting instructions.

14. A portable altitude/depth measuring apparatus for measuring an altitude or a depth, comprising: a pressure sensor for sensing a pressure external of the apparatus and producing a corresponding output signal; a memory for storing a pressure value corresponding to a threshold altitude or depth; and a comparing circuit for comparing the stored pressure value with the output signal of the pressure sensor to detect when the threshold altitude or depth has been reached, without converting the pressure value or the output signal of the pressure sensor into corresponding altitude or depth values during measurement.

15. A portable altitude/depth measuring apparatus according to claim 14; wherein the pressure sensor comprises a pressure detector for detecting the external pressure and producing a corresponding analog output signal, and an A/D converter for converting the analog output signal into a digital value.

16. A portable altitude/depth measuring apparatus according to claim 14; further comprising a manually operable input switch for inputting the threshold altitude or depth; and a calculating circuit for calculating a pressure corresponding to the threshold altitude or depth manually input using the input switch.

17. A portable altitude/depth measuring apparatus according to claim 14; further comprising a manually operable input switch for setting a current altitude or depth at which the apparatus is positioned as the threshold altitude or depth; and a calculating circuit for calculating a pressure corresponding to the threshold altitude or depth.

18. A portable altitude/depth measuring apparatus according to claim 14; further comprising an altitude or depth calculating circuit for calculating an altitude or depth based on the output signal of the pressure sensor.

19. A portable altitude/depth measuring apparatus according to claim 14; further comprising a main body for housing the pressure sensor, the memory and the comparing circuit; and a strap for mounting the main body to a user's arm.

* * * * *